Patented Feb. 27, 1923.

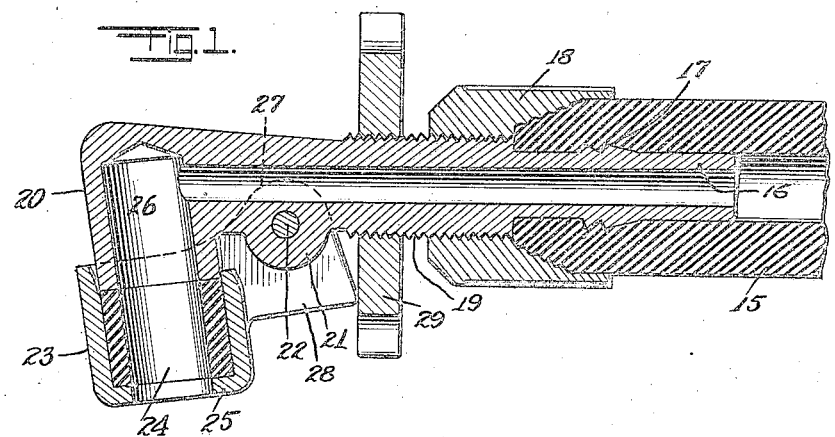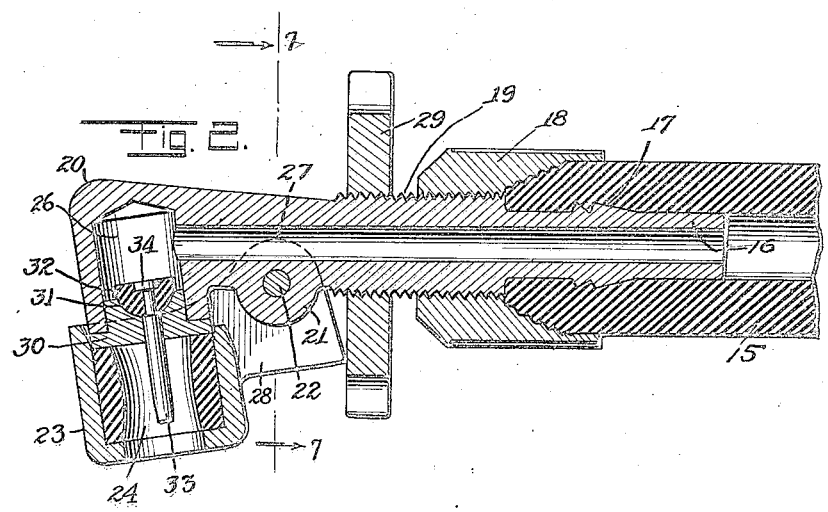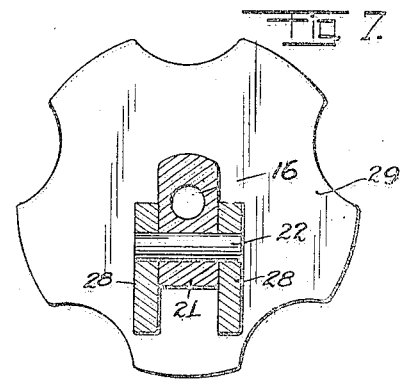

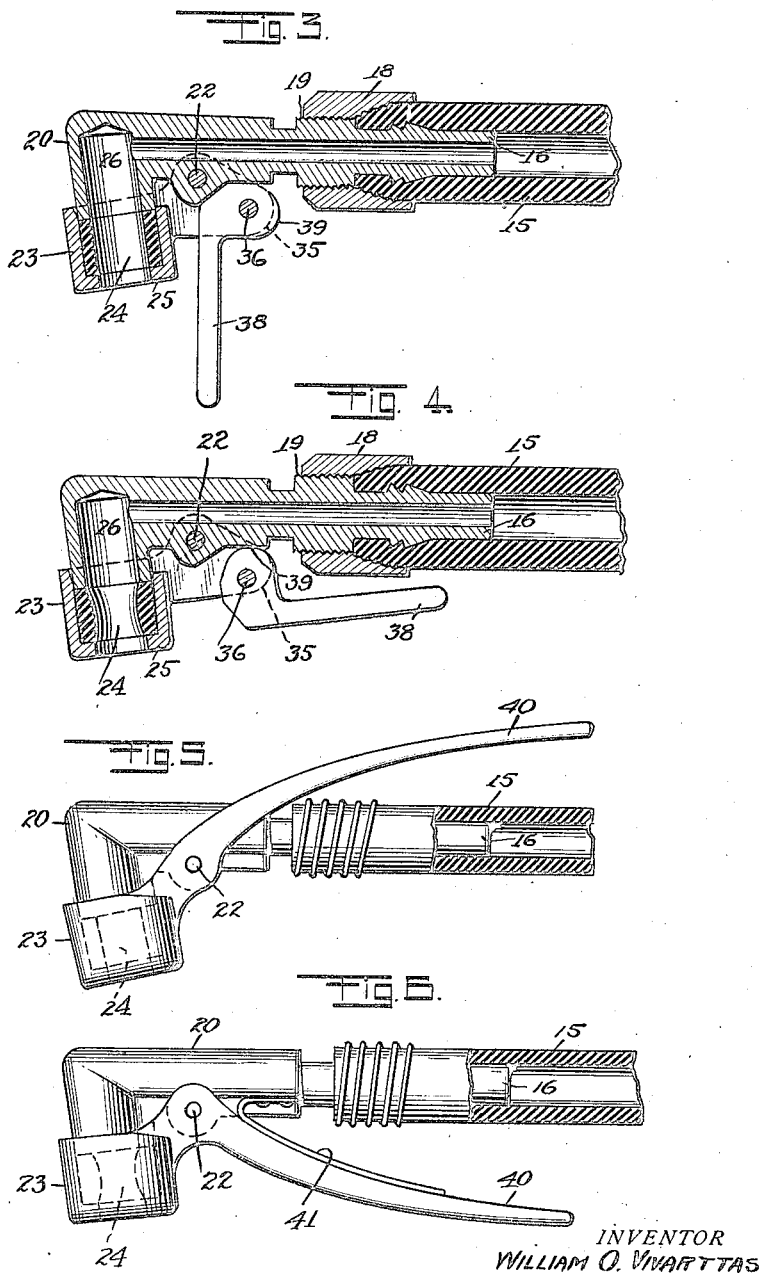

1,446,489

UNITED STATES PATENT OFFICE.

WILLIAM O. VIVARTTAS, OF WEEHAWKEN, NEW JERSEY.

COMPRESSED-AIR-PIPE COUPLING.

Application filed March 10, 1920. Serial No. 364,739.

*To all whom it may concern:*

Be it known that I, WILLIAM O. VIVARTTAS, a citizen of the United States, and a resident of Weehawken, in the county of Hudson and State of New Jersey, have invented certain new and useful Improvements in Compressed-Air-Pipe Couplings, of which the following is a full, clear, and exact description.

Among the principal objects which the present invention has in view are: to rapidly adjust the coupling in service position; to easily lock the same in service by means of a simple device; and to simplify and cheapen the construction.

Drawings.

Figure 1 is a longitudinal section of a simplified form of coupling, constructed and arranged in accordance with the present invention.

Figure 2 is a similar view, showing the same equipped with a check valve.

Figure 3 is a longitudinal section of a modified form of the invention inactively arranged.

Figure 4 is a similar view constructed and arranged as in action.

Figure 5 shows a further modification of the form of the invention.

Figure 6 is a modification of the form shown in Fig. 5.

Figure 7 is a cross section taken as on the line 7—7 in Fig. 2.

Description.

As seen in the drawings, the coupling herein disclosed is preferably attached to a rubber hose 15, by inserting in the passage thereof a stem 16, that is provided with an enlarged member 17. The member 17 co-operates with a sleeve 18 which engages a threaded portion 19 by which it is moved forward over the end of the hose to compress the same and hold it in engagement with the enlarged portion 17.

In the present form of the invention the stem 16 and the threaded portion 19 are made integral with a head 20. The head 20 is tubular or hollow in form, and has the hinge lugs 21 provided with perforations through which pins 22 are driven. The hollow portion of the head is in open communication with an air passage which extends into and co-operates with the passage in the center of the hose 15.

The axes of the stem 16 and head 20 are angularly disposed. The angular arrangement has for its object to permit and to suggest lifting the stem 16 to approximately a horizontal position when the coupling is in service. Prior to lifting the stem in this manner, the cup member 23 and the rubber filler 24, held therein, are adjusted over the end of a pneumatic tire valve stem which is usually vertically disposed in a plane substantially perpendicular to the extension of the pipe 15.

In the position shown in Figure 1 of the drawings, the rubber filler 24 is relaxed, and the walls of the central passage therethrough are substantially parallel. When, however, the cup member 23 and the filler 24 thereof are adjusted, and the stem 16 is lifted, the filler 24 is compressed between the inturned annular flange 25 of the cup member 23, and the shoulders 26 of the head 20, with the result that the filler is bulged inward to firmly grip the end of the pneumatic tire valve stem, and to assume in conjunction therewith an air-tight grip.

To swing the cup member 23 in the manner indicated, the said member has hinged knuckles 27, which encompass the lugs 21 and receive the pins 22. The knuckles 27 have each a wing 28, the rear edge whereof engages a disk nut 29, which serves to lock the cup member 23 and the head 20 in the relation where the filler 24 is compressed or crowded inwardly upon the pneumatic tire valve stem. The nut 29 engages the thread on the portion 19 of the stem 16 and has a limit of movement between the wings 28 and the sleeve 18. To facilitate the rotation of the nut 29 the perimeter thereof is knurled or milled. As shown in the drawings, the wings 28 are rearwardly extended, to form a bearing corner removed from the pivotal center of the pins 22 and adjacent the perimeter of the nut 29. By this arrangement adequate resistance to the resiliency of the filler 24 is provided by the nut 29.

When operating a coupler constructed and arranged in accordance with the above disclosure, it is obvious the attendant holding the end of the hose equipped with the coupler places the cup member 23 over the end of the pneumatic tire valve stem, which is to be inflated, and over the reduced end thereof, which is threaded to hold the dust cap with which it is usually provided, and which is removed prior to inflating the tire. When the cup member 23 and filler 24 are thus arranged, the stem 16 is straightened or raised, with the result that the head 20 and cup member 23 are relatively rotated to move the shoulder 26 toward the flange 25, with the result that the filler 24 is crowded inwardly on to the pneumatic tire valve stem. In this position it will be found the wings 28 have separated from the nut 29 and moved to a forwardly position. Without removing the strain on the stem 16, the operator now rotates the nut 29 until it closes up to and engages the corners of the wings 28. Thereafter when the hold on the pipe is relieved, the cramp on the filler 24 is maintained.

It will be observed that the construction shown in Figure 1 has no means of preventing the escape of compressed air from the pipe 15. Such a construction would necessitate that after the pipe had been used for inflating the tire, the attendant would be compelled to close the valve at the source of supply. When it is desired to employ a check valve, this is furnished by inserting a bushing 30 into the head 20 forming what is known as a drive fit therewith. The bushing 30 is ground, to form a ball valve seat 31, upon which in practice seats a segmental globular rubber gasket 32. The gasket 32 forms an air sealed valve, and is mounted on the stem 33, the end whereof is shaped to form an undercut head 34, which fits within the center of the gasket valve 32.

The bushing 30 is so placed in the head 20 that the seat 31 thereof is below the passage in the stem 16, where the same enters the hollow of the head 20. This provides for seating the valve by the pressure of air in the pipe 15. The stem 33 is made sufficiently long to engage the stem of the valve, with which the pneumatic tire valve is usually provided, which operates to lift the valve 32 from its seat as the coupling is forced into service position.

In the modified form of the invention shown in Figure 3, the wings 28 are provided with a rocking cam 35, which is pivotally mounted between the said wings by the pin 36. The cam edge rides on a flattened portion 37 of the stem 36, and is operated to that end by a handle 38. Whenever the handle 38 is moved toward the hose 15, the cup member 23 is rocked on the pin 22, in the manner similar to that described above. As the result of lifting the stem 16 the peak 39 of the cam 35 is disposed with reference to the pin 36 so that when raised by the handle 38 into working position, it is so closely in line with the center of the pin 36 as to resist effectually any effort to open the lock formed by the said cam. This form of the invention is effective, and in some cases desired, but does not provide for wear on the cam 35. Also it is not thought to be as cheap or as simple of manufacture as the form shown in the previous figures of the drawings.

The modified forms shown in Figures 5 and 6 provide a hand grip 40, which in the one case is manually operated to close the cup member 23 on the head 20, while in the latter case the expansion of the spring 41 effects the same purpose. In both instances the cup member 23 and head 20 rock on the pivot pin 22. It will be understood that the forms of the coupling shown in Figures 3 to 5 inclusive, may be equipped with a check valve substantially as described above.

*Claims.*

1. An apparatus as characterized comprising an internally expansive member adapted to close on the end of an air filling tube; a plurality of rigid members movable to compress said member, and means for holding said members in compressed relation, said means being manually operable for interposition between parts of said members subsequent to the compressive action thereof for preventing the retraction thereof.

2. An apparatus as characterized comprising an internally expansive member adapted to close on the end of an air filling tube; a plurality of rigid members movable to compress said member; and means for holding said members in compressed relation, said means being manually operable for interposition between parts of said members subsequent to the compressive action thereof for preventing the retraction thereof, said means embodying a pivotal connection between said members.

3. An apparatus as characterized comprising an internally expansive member adapted to close on the end of an air filling tube; a plurality of rigid members movable to compress said member; and means for holding said members in compressed relation, said means being manually operable for interposition between parts of said members subsequent to the compressive action thereof for preventing the retraction thereof, said means embodying a rocking connection between said members, and further embodying a device movably mounted on one of said members for engaging to hold the other of said members in adjusted position to prevent the retraction thereof from the other of said members.

4. An apparatus as characterized comprising a tubular head having a tubular stem; a cup-like member pivotally connected therewith at a point removed from said head; a resilient filler mounted between said cup member and said head for engagement thereby to be compressed by the movement of said head and cup member toward each other; and means mounted upon and movable lengthwise of said stem for engaging said cup member to hold the same in compressing relation to said filler.

5. An apparatus as characterized comprising a tubular head having a tubular stem; a cup-like member pivotally connected therewith at a point removed from said head; a resilient filler mounted between said cup member and said head for engagement thereby to be compressed by the movement of said head and cup member toward each other; and means mounted upon and movable lengthwise of said stem for engaging said cup member to hold the same in compressing relation to said filler, said means embodying a screw threaded nut engaging said stem and adapted for interposition between said head and cup member to prevent the retractive movement thereof.

6. An apparatus as characterized comprising an internally expansive member adapted to close on the end of an air filling tube, a rigid member and a member tiltable relative thereto in a direction substantially at right angles to the greatest length of the rigid member to compress the expansive member.

7. An apparatus as characterized comprising an internally expansive member adapted to close on the end of an air filling tube and a rigid member and a member tiltable relative thereto to compress the expansive member and means for holding the rigid and tiltable members in compressed relation.

8. An apparatus as characterized comprising an internally expansive member adapted to close on the end of an air filling tube and a rigid member and a member tiltable relative thereto to compress the expansive members and means engaging the tiltable member to hold the same in fixed position with the expansive member under compression.

9. An apparatus as characterized comprising an internally expansive member adapted to close on the end of an air filling tube and a rigid member and a member rocking relative thereto in a direction substantially at right angles to the longitudinal axis of the rigid members to compress the expansive member and means engaging the rocking member to hold the same in fixed position with the expansive member under compression.

WILLIAM O. VIVARTTAS.